Figure 2:
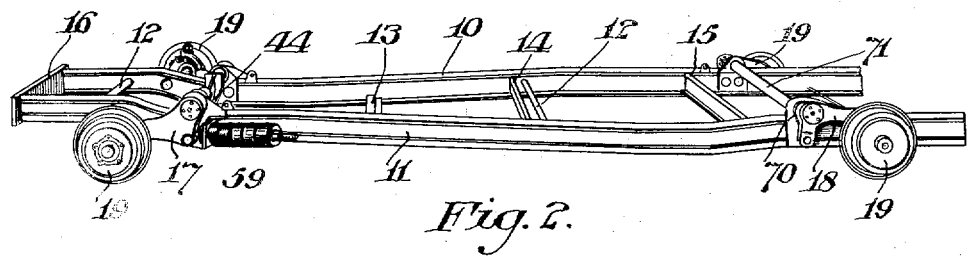

May 21, 1935.　　　　J. LEDWINKA　　　　2,001,846
VEHICLE FRAME
Filed July 8, 1932　　　4 Sheets-Sheet 1

INVENTOR.
JOSEPH LEDWINKA
BY John P. Tarbox
ATTORNEY.

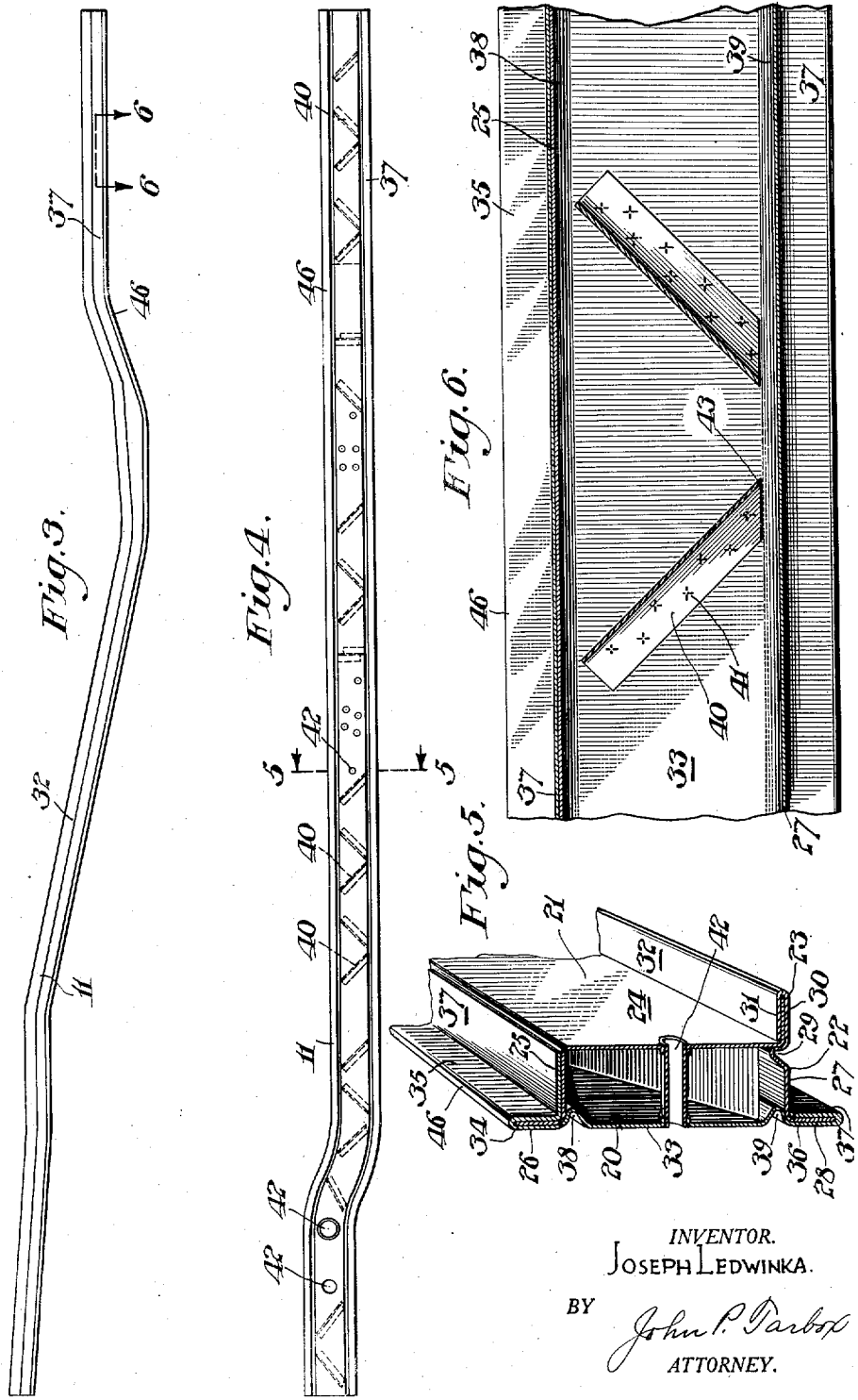

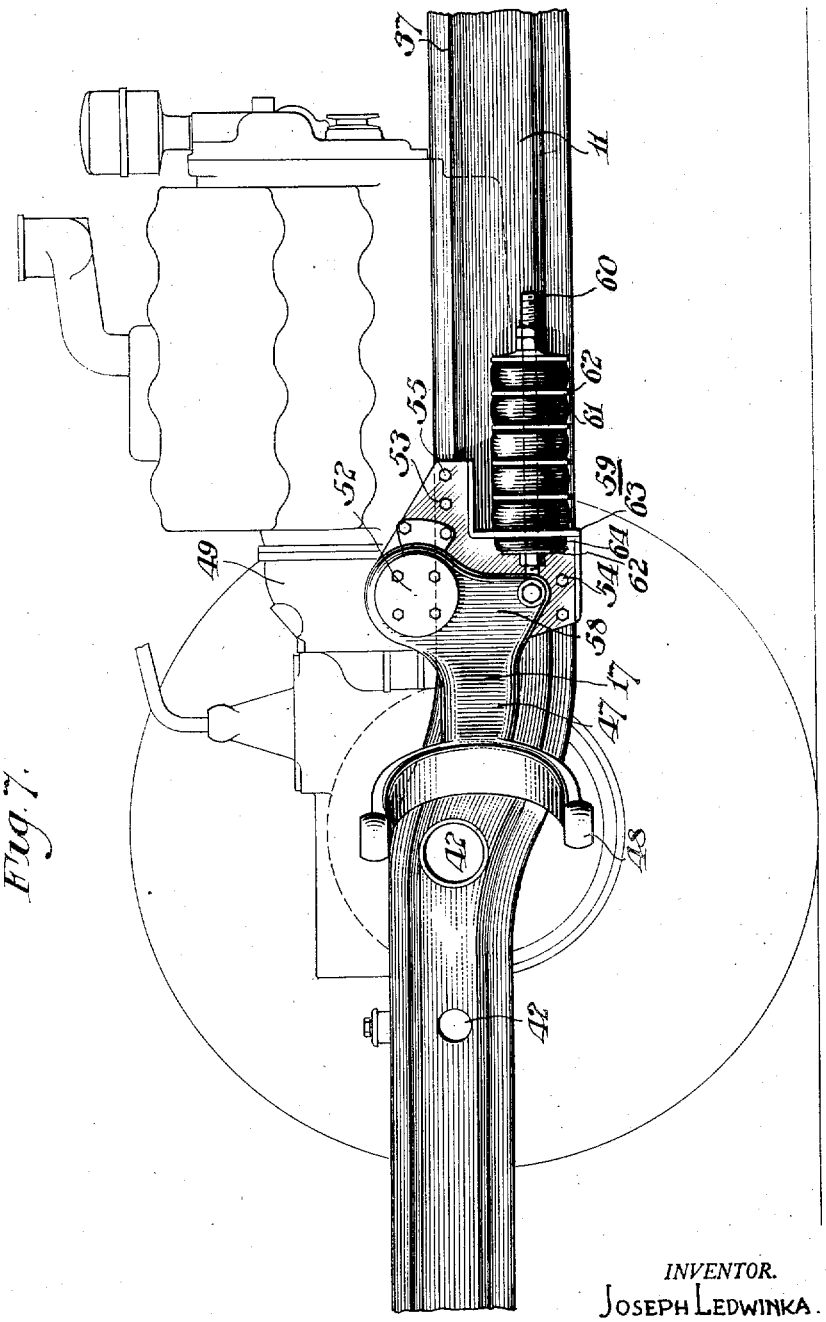

INVENTOR.
JOSEPH LEDWINKA.
BY John P. Tarbox
ATTORNEY.

Patented May 21, 1935

2,001,846

UNITED STATES PATENT OFFICE 2,001,846

VEHICLE FRAME

Joseph Ledwinka, Philadelphia, Pa., assignor to Edward G. Budd Manufacturing Company, Philadelphia, Pa., a corporation of Pennsylvania Application July 8, 1932, Serial No. 621,369
5 Claims. (Cl. 280—106)

My invention relates to sheet metal structural units and more particularly to such units arranged for fabrication into a vehicle chassis and more especially the sills. It also comprehends such a construction well adapted to result in a vehicle having a relatively low center of gravity and allowing substantially the elimination of the usual spring structure while giving a structure well adapted for use in connection with vehicles of the front wheel drive type.

It is especially desirable under modern requirements, to build automotive vehicles with relatively low center of gravity, while at the same time, constructing such a vehicle with relatively great structural strength and of very low weight. Inasmuch as vehicle speeds are rapidly increasing, the movable mass of the vehicle preferably should be commensurately reduced without inherently affecting the strength of the structure as a whole.

I accomplish the above desirable features and others incidental thereto by fabricating the chassis of relatively thin sheet metal stampings contoured to provide a body securing zone and making possible, the elimination, if desirable, of separate cross bracing for the vehicle body independently of the chassis structure. The chassis side sills are likewise offset from front to rear in such a manner as to allow the supported weight to be lower centrally of the chassis than is possible with the sills longitudinally at all points within the same plane.

Another object of this invention is to construct in one unit both the features of a spring and a shock absorber arranged for easy securement to the sills.

In the drawings, like ordinals represent corresponding parts in the various figures.

Figure 1:
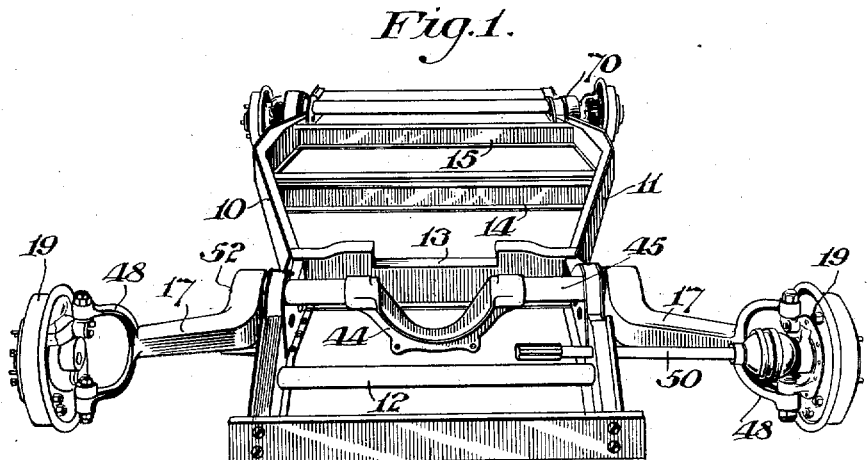
Figure 8:
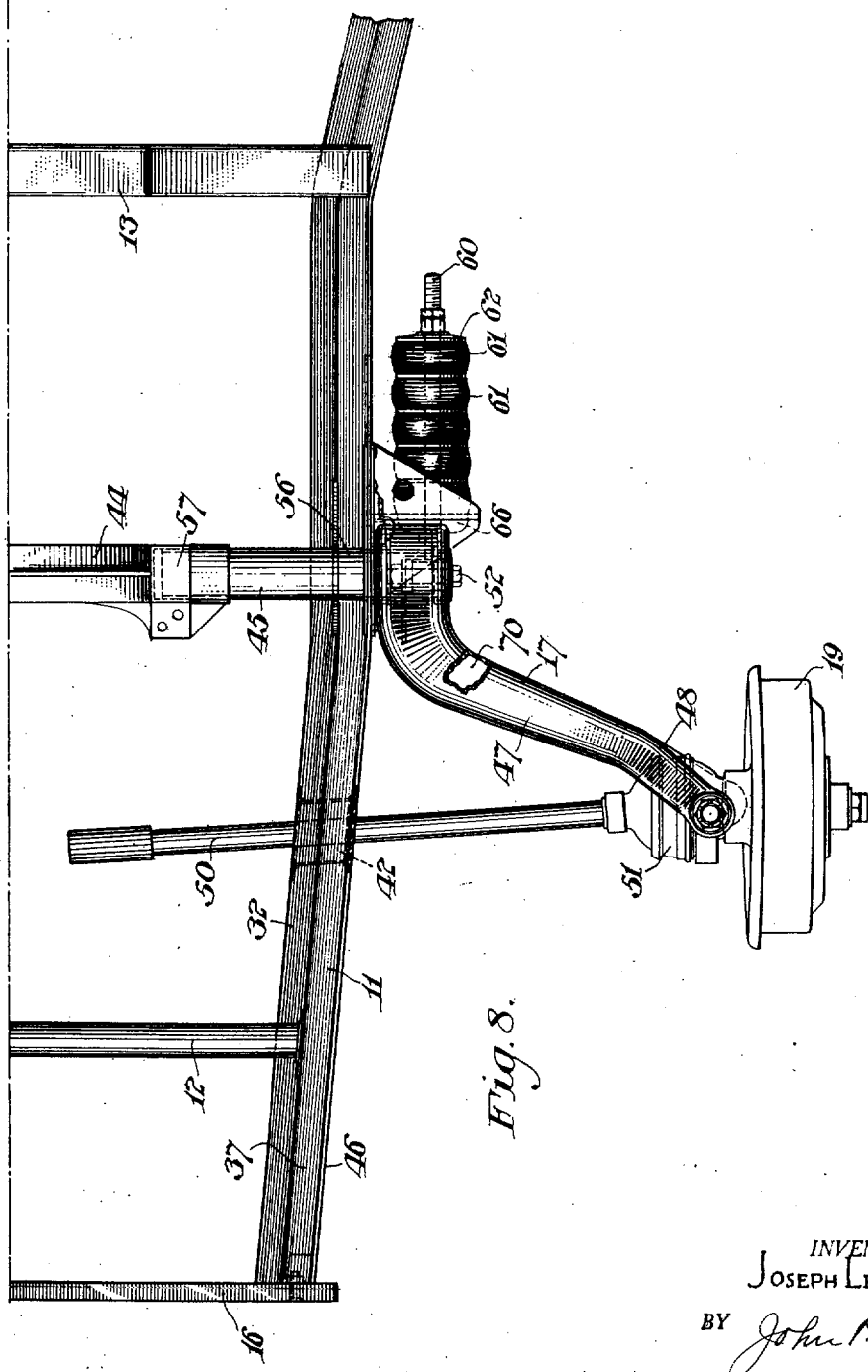

Figure 1 is a chassis perspective incorporating advantageous features of my invention, Fig. 2 is similarly a side perspective of the chassis, Fig. 3 shows a plan of the side sill contoured in complemental relation with the lowermost portions of the vehicle body, Fig. 4 is an elevation of the same sill showing the front to rear plural plane sections, Fig. 5 shows a cross section partly in perspective on the lines 5—5 of Fig. 4, Fig. 6 is a partial section in elevation on line 6—6 of Fig. 1, Fig. 7 is an elevation showing the wheel unit suspension in co-operative relation with the chassis, and Fig. 8 is a partial plan of the chassis and wheel unit suspension.

The vehicle chassis constructed in accordance with my invention consists primarily of the side sills 10 and 11, and a plurality of cross brace members of various sections, some being hollow tubular members 12, whereas others are hollow box section members 13, 14 and 15, and some may even be of channel or other suitable form 16, all of the said members being commensurately of relatively great strength and light weight. Some of the cross members may even combine the tubular and box section form as the bracing 44, which serves as a saddle for the engine as well as a bearing for the tubular portions 45. At each wheel, a wheel unit supporting arm 17 of suitable form is used. As to the front wheels, this member is substantially as shown in Figures 7 and 8, whereas the rear wheels are shown by slightly modified form 18. For purposes of clearness, the wheels are not shown, the central hub portions 19 thereof being the only part illustrated.

The side sills 10 and 11 are substantially similar, the primary difference being that the variation in contour is generally laterally oppositely disposed in the two said sills. I construct the side sills of structural members fabricated from a plurality of sheet metal stampings 20, 21 and 22. The member 21 is substantially Z-shape, having an inwardly extending flange 23, a portion of relatively great width 24 forming one side wall of the sill and a part of the web of the box section, an outwardly extending portion 25 arranged to serve as one wall of the box section and a vertically extending portion 26 comprising an upwardly extending flange.

The lower member 22 comprises substantially the lower wall of the box section 27 having a downwardly extending flange 28 and a longitudinally extending rib 29 arranged to serve as a reinforcement for the side wall 24 at the lower edge and at 30 and 31 reversibly bent and crimped serving to provide the laterally extending ledge 23 with the triple section of great strength, the three thicknesses combining to provide an integral ledge for the reception of the floor boards of the vehicle.

The remaining side wall 20 is formed of a sheet metal stamping having a central portion 33 serving as the outer side wall of the box section of the side sill and projecting vertically upwardly and downwardly beyond the upper and lower faces of the box section to provide additional reversely bent flanges 34 and 35 and 36 and 37 respectively. The upper flange 35 is again bent inwardly at 37 to provide a complemental portion for co-operation with the laterally extending portion 25 of the member 21, thereby providing a double thickness upper wall to the box section. The lower flange of the stamping 20 does not extend laterally to provide a reinforcement as is provided at the upper limits of this member.

Additional strength is accomplished by longitudinally ribbing the member 20 at a plurality of points 38 and 39. This ribbing is adjacent the corners of the box section, thereby giving a much greater strength to the member than would otherwise be possible. Interiorly of the box section and diagonally disposed therein are a plurality of channel members 40. These members 40 are substantially alternately oppositely disposed and are spot welded, as at 41, to the adjacent side walls 24 and 33, providing interiorly thereof a substantially truss structure as well as an anchorage for the side walls at suitable spaced apart points along the side sill. Tubular members 42 of varying dimension for the reception of spindles and brake operating levers and other apparatus are used. Although not being indicated upon the drawings, the variously extending flanges may be spot welded for purposes of greater strength and more permanent securement throughout. The ribbing of the stamping 20 complementally to the ribbing in the member 22 provides a substantially bulbous channel section. The lower side wall of the sill provides spaced portions between the lowermost portions 43 of the diagonally disposed reinforcement and the central or web portion 27 of the stamping 22.

The side sill thus constructed provides a substantially box section with a plurality of different types of reinforcement greatly strengthening the section and also being secured together from a plurality of sheet metal stampings throughout their edges exteriorly of the box section per se. Each and every one of these flanges preferably forms a continuation of an adjacent side wall extending in different directions. The flange 32 serves as a supporting framework for the floor boards of the vehicles, whereas the flange 46 extends upwardly and being of complemental contour with the body is thereby arranged for ready securement thereto. The lower flange 37 serves to provide a means of lowering the point of connection between the chassis and the wheel unit supporting arms. The seat 37 formed by the angular relation of the flange 46 and the inwardly extending portion of member 20 serves to act as a base unit for the vehicle seats or any other internal structures normally arranged at this elevational plane.

The wheel unit supporting arms 17 are of substantially tubular sheet metal construction as shown at 70 forming a bell crank the two arms being substantially integral, one of the said arms being radially offset, thus providing what would be possibly a departure from a true bell crank. This member comprises the arm 47 extending angularly outwardly from the chassis and terminating in a bifurcated end portion 48 arranged for the reception and retention of a spindle upon which the front wheels pivot in steering. Power from the motor 49 is transmitted to the wheels through a drive shaft 50 passing through the opening 42 of the side sill and exteriorly to drive the wheels by means of a universal joint 51. The wheel unit support is pivoted about an axis 52 appreciably above the top surface of the side sill. This is accomplished by means of a bracket 53 secured to the upper and lower flanges of the side sill by a plurality of bolts 54 and 55. In this manner the entire unit may be replaced independently of the parts. The arm is provided with a lateral extension 45 serving as a shaft for reception in the bearing at 56 and 57.

The other arm 58 of the bell crank is arranged to have a pivotal connection with a resilient member 59. This member comprises primarily a center rod 60 having a plurality of resilient elements or toroids 61 and metallic discs 62, one group being disposed longitudinally at one side of the arm 63 of the bracket 53 and one or more members 64 at the opposite sides thereof providing respectively the one as a replacement for the springs generally used and the other as the shock absorbing device to prevent the transmission to the body of ordinary road irregularities.

At the opposite end of the vehicle a similarly functioning construction is used wherein the wheel unit supporting arms are of slightly different form as at 18 in Fig. 2. In this instance the bearing member corresponding to the members 45 at the opposite end of the vehicle is here a continuous member 71 passing transversely across the entire chassis width. Likewise the pivoting of the wheel units above the chassis plane allows an underslung chassis construction, giving a much lower center of gravity while at the same time allowing a resilient means 59 to be disposed longitudinally in substantial parallel relation to the chassis sill at a point avoiding any undesirable outside appearances of these parts.

By means of this sheet metal construction of box section a structure of great strength is developed without the enormous weight consequent to solid structures of the same dimension. A vehicle constructed in this manner has very desirable riding qualities and is not subject to many of the disadvantages found in previous structures.

I aim to cover in the appended claims all modifications within the true spirit and scope of my invention, and although necessarily limited in terminology to some definite descriptive words undue restrictions and unnecessarily limited scope should not be attributed to the invention as a result.

What I claim is:

1. An automobile chassis sill of closed polygonal cross section comprised of a multiple number of longitudinally extending stampings joined together by lapped flanges located exteriorly of the closed section and characterized by a substantially vertical disposition of one of said joints at the upper outer edge of the section and the disposition of another of said joints substantially horizontally at the lower inner edge of said section.

2. An automobile chassis sill according to claim 1 in which a topmost substantially horizontal wall of the cross section immediately adjoins the substantially vertically disposed exterior lapped joint and a substantially vertically disposed inner wall of the cross section adjoins the substantially horizontally disposed lapped joint.

3. An automobile chassis sill according to claim 1 in which the polygonal cross section is substantially rectangular and the bottom wall of the section is joined to the outer wall by an exterior lapped joint substantially vertically disposed at the lower outer extremity of the cross section.

4. An automobile chassis sill having opposed side walls connected together at intervals by channel cross section braces extending from top to bottom of the cross section spot welded to both sides from the side walls of the channels, one of the top and bottom walls of the cross section being constituted a separate element from the remaining walls and joined thereto by externally made joints, whereby the said braces may be introduced between the side walls and spot welded in place and the said externally joined wall thereafter applied to close the cross section.

5. An automobile chassis sill having opposed side walls connected together at intervals by channel cross section braces extending from top to bottom of the cross section spot welded to both sides from the side walls of the channels, one of the top and bottom walls of the cross section being constituted a separate element from the remaining walls and joined thereto by externally made joints, whereby the said braces may be introduced between the side walls and spot welded in place and the said externally joined wall thereafter applied to close the cross section, the said channel sectioned internal braces being arranged in the form of a Warren trussing and having their channel cross sections presenting toward the said externally joined wall.

JOSEPH LEDWINKA.